United States Patent [19]
Young

[15] 3,704,459
[45] Nov. 28, 1972

[54] SEED PLANTER-FAILURE DETECTOR
[72] Inventor: Walter A. Young, Route 1, Pine Street, Creston, Ohio 44217
[22] Filed: Oct. 4, 1971
[21] Appl. No.: 186,045

[52] U.S. Cl.................340/271, 200/28, 340/267 R
[51] Int. Cl............................................G08b 21/00
[58] Field of Search..............340/271, 267 R; 200/28

[56] References Cited

UNITED STATES PATENTS

| | | | |
|---|---|---|---|
| 3,185,118 | 5/1965 | Greene | 340/271 |
| 3,623,059 | 11/1971 | Rickerd | 340/271 |
| 2,677,021 | 4/1954 | Baumgardner | 340/271 |
| 3,550,108 | 12/1970 | Orlando | 340/271 |
| 2,761,126 | 8/1956 | Morsching | 340/271 |

Primary Examiner—John W. Caldwell
Assistant Examiner—Glen R. Swann, III
Attorney—Albert H. Oldham et al.

[57] ABSTRACT

A detector system for a seed planting machine of the type typically pulled behind a motorized tractor, and having a plurality of rotatable shafts connected by shear pins to a main drive shaft, is provided to detect when one or more of the rotatable shafts stops rotating during the machine's operation. An indicator panel is provided with light bulbs wired in parallel to one side of the tractors battery. Each of the bulbs is connected to a contact arm held in a position adjacent to a rotatable shaft. A pin is provided in each rotatable shaft to contact the contact arm intermittently upon rotation of the shaft. The rotatable shafts are grounded to the frame of the seed planting machine and to the frame of the tractor. The other side of the battery also is grounded to the frame of the tractor. Thus as each rotating shaft causes the pin therein to make contact with the contact arm an electrical circuit is completed and the indicator bulb wired to that contact arm lights up. Thus, when the seed planting machine is in operation, failure of an indicator light to intermittently blink "on" and "off" indicates that one of the rotating shafts has stopped rotating because of breakage of the shear pin connection.

4 Claims, 2 Drawing Figures

INVENTOR.
WALTER A. YOUNG

BY Oldham & Oldham

ATTORNEYS 3,704,459

SEED PLANTER-FAILURE DETECTOR

BACKGROUND OF THE INVENTION

This invention relates to an apparatus used on a seed planting machine to indicate failure of one or more of a plurality of rotating shafts to rotate during operation of the machine. Modern seed planting machines are commonly wheeled vehicles pulled behind a motorized tractor or they may be self propelled. As the planting machine moves forward, several rows of seed are planted simultaneously. This is commonly achieved by driving a plurality of rotatable shafts off of a main drive shaft by a sprocket gear means. Each of the rotating shafts causes reciprocal movement of a lever arm planting mechanism which punches a hole into the soil into which seed is placed. Each of the rotating shafts which drives a planting mechanism for one row of seeds is connected to the main sprocket gear by means of a shear pin. Shearing of the shear pin prevents breakage of the shaft or other vital parts of the machine in case the planting mechanism strikes a rock or other hard object in the ground. A common problem with this type of machine is that a farmer simultaneously planting several rows of seed may discover that during the planting operation a shear pin was broken and one row of seed was not planted. There is presently no means available whereby the farmer or machine operator can be alerted to the fact that a shear pin has been broken, other than by visually observing the rotation of the shafts during the planting operation.

SUMMARY OF THE INVENTION

It is the primary object of the present invention to provide a detection system to immediately alert the operator of a seed planting machine to the fact that because of shear pin breakage, one or more rows of seed are not being planted during the operation of the planting machine. It is necessary that such a detection device give warning to the operator who is sitting in a forward looking position in a cab of a tractor pulling a planting machine or in the cab of a self propelled planting machine. Such a detector system must be capable of withstanding the vibrations, dirt, dust, water, and other natural elements accompanying the operation of a seed planting machine.

Another object of the present invention is to provide a simple, rugged and highly reliable detection system that can withstand the rigors of a seed planting operation.

A further object of the invention is to provide a detection system that is easily maintainable and repairable by the operator of seed planting machinery even during the time the machinery is in use in the field.

A further object of the invention is to provide a detection system which is characterized by its simplicity of construction and economy of construction and maintenance.

The above and other objects of the invention will become apparent upon consideration of the following specification and the accompanying drawings wherein there is shown a preferred embodiment of the invention.

DESCRIPTION OF THE PREFERRED EMBODIMENT

Figure 1:
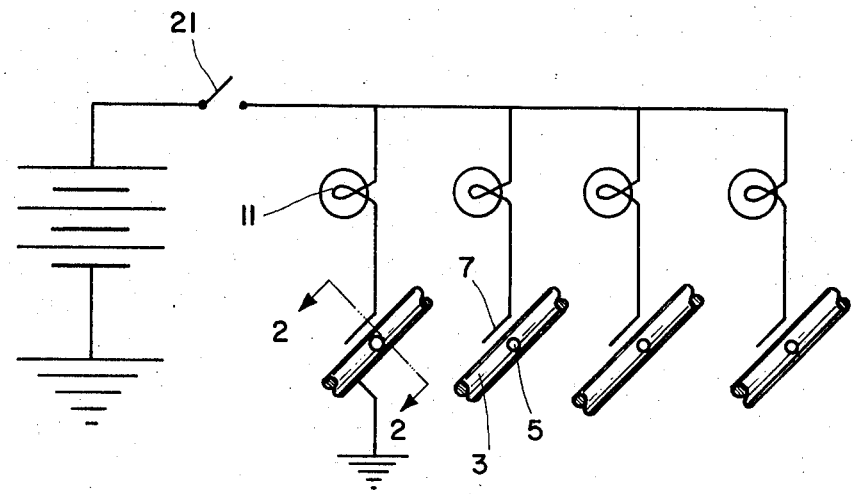
FIG. 1 is a schematic drawing of the electrical circuit showing the main components of the system.
Figure 2:
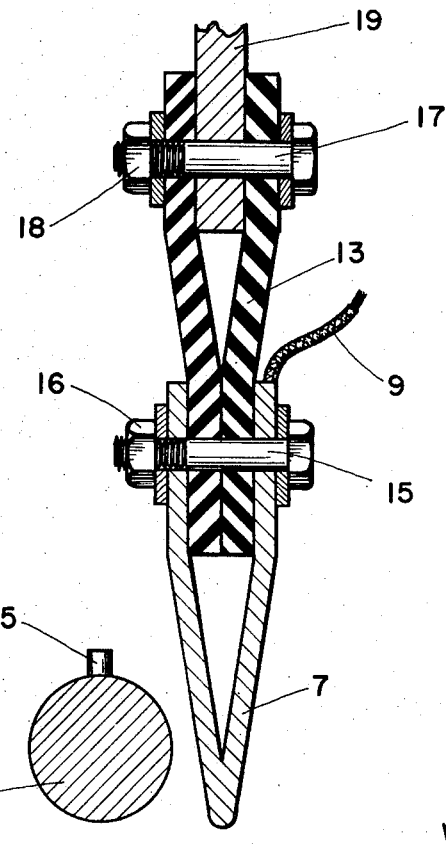
FIG. 2 is a sectional view taken along line 2—2 of FIG. 1 showing in detail the rotatable shafts, shaft pin, contact arm, and a means of attachment of the contact arm to the frame of the planting machine.

One side of the tractor battery or the battery that would be used in a motor driven self propelled seed planting machine, is wired to ground by attachment to the frame of the vehicle. The rotatable shafts of the seed planting machine are also indirectly connected to the frame of the tractor or self propelled vehicle. The other side of the battery leads to one side of a main "off" and "on" switch 21. This switch is manually operated and should be left in the open position when the planting machine is not in use to prevent drainage of the battery if any of the indicator bulbs 11 are on. The indicator bulbs 11 are wired in parallel and are connected to the other side of the switch 21. Indicator bulbs 11 are mounted in a panel placed in the cab of the tractor or self propelled machine in a conspicuous position where they can be readily observed by the vehicle operator. The intensity of the bulbs should be sufficient when lit to readily be apparent to the vehicle operator even in sun light or other bright outdoor lighting conditions. Each of the bulbs is wired to a contact arm 7 shown in detail in FIG. 2. As can be seen in FIG. 2, the contact arm 7 is placed in a position closely adjacent to the rotatable shaft 3. As the shaft 3 is rotated the shaft pin 5 intermittently contacts the contact arm 7. The shaft pin 5 should be firmly attached to the rotatable shaft 3 in such a manner that it makes electrical contact therewith. It should extend radially outwardly from the side of the shaft a distance of one-eighth to one-half inch. The shaft pin 5 should be made of an electrically conductive material such as metal. It should be of a wear resistant, non corrosive material. It preferably should be made of brass or copper, although other metals could also be used.

The contact arm 7 must also be made of an electrically conductive material such as metal. It also should be made of a material that is wear resistant, and non-corrosive. Again brass or copper could preferably be used for making contact arm 7 although other metals could be used. Contact arm 7 is mounted in cantilever fashion to a mounting bracket 19 mounted on the frame of the seed planting machine. It is essential that there be no electrical continuity between the frame of the seed planting machine and contact arm 7. The mounting bracket 19 may be made of any suitably strong material including metal. A flexible connector 13, made of a non-conductive material, is used to connect the contact arm 7 with the mounting bracket 19. The contact arm 7 is attached to one end of the flexible connector 13 by means of a bolt 15 and nut 16. The other end of the flexible connector 13 is attached to the mounting bracket 19 by means of a bolt 17 and nut 18. A wire 9 attaches to the contact arm 7 and leads to one of the bulbs 11 in the indicator panel. The flexible connector 13 is important not only in insulating the contact arm 7 from the frame of the planting machine but also in allowing movement of the contact arm 7 as contact is made between the shaft pin 5 and the contact arm 7. This allows contact of a uniform pressure to be made during the period of rotation of the rotatable shaft 3 in which the shaft pin 5 contacts the contact arm 7. Rubber, fabric reinforced rubber, or any strong, flexible, non-conductive material could be used for making connector 13.

As each of the rotatable shafts rotates during operation of the planting machine, the shaft pin thereon makes intermittent contact with the contact arm adjacent to the rotatable shaft. Each intermittent contact completes an electrical circuit causing an indicator bulb to light. Thus during operation of the planting machine, the indicator bulbs each blink on and off intermittantly. Failure of a bulb to blink on and off indicates failure of a rotatable shaft to turn.

While one complete embodiment of the invention has been disclosed herein, it will be appreciated that modification of this particular embodiment of the invention may be resorted to without departing from the scope of the invention as defined in the appended claims.

What is claimed is:

1. A detector system for a seed planting machine equipped with a means for being operated by a motorized tractor with a battery, a frame, a plurality of rotatable shafts driveably connected at one end by a sprocket-shear pin connection to a main drive shaft and connected at the other end to seed planting means; said system comprising:

a. a plurality of electrically conductive shaft pins, one of which is attached to the side of each of the rotatable shafts, makes electrical contact therewith and extends radially outwardly therefrom a distance of one-eighth to one-half inch, and rotates around the axis of the shaft when the shaft is rotated;

b. a plurality of cantilever support brackets mounted at one end to the frame of the planting machine;

c. a plurality of electrically conductive contact arms each of which is supported as a cantilever by attachment at one end to one of the support brackets by a flexible insulator, the free end of each contact arm resting in a position adjacent to and within one-eighth to one-half inch of one of the rotatable shafts whereby rotation of the shaft causes intermittent contact to be made between the shaft pin and the contact arm, the flexible attachment of the contact arm allowing the contact arm to ride up and over the shaft pin to make uniform intermittent contact as the shaft pin rotates about the axis of the rotatable shaft without damage or excessive wear to the shaft pin or contact arm;

d. a plurality of electric light bulbs mounted on an indicator panel in the cab of the tractor; and e. an electrical circuit powered by the tractor battery, with one side of the battery connected to each of the rotatable shafts and the other side connected in parallel through an off and on switch to one side of each of the light bulbs, the other side of each light bulb which is connected to one of the contact arms, whereby contact between a contact arm and a shaft pin completes the circuit to light a bulb in the indicator panel.

2. A detector system for a seed planting machine as recited in claim 1, wherein the electrically conductive shaft pins and the electrically conductive contact arms are made of copper.

3. A detector system for a seed planting machine as recited in claim 1, wherein the electrically conductive shaft pins and the electrically conductive contact arms are made of brass.

4. A detector system for a seed planting machine as recited in claim 1, wherein the flexible insulators connecting each of the plurality of contact arms to each of the plurality of cantilever support brackets are made of fabric reinforced rubber.

* * * * *